No. 770,141. PATENTED SEPT. 13, 1904.
E. C. & C. B. WOOD.
WATER GAGE.
APPLICATION FILED DEC. 16, 1903.
NO MODEL.
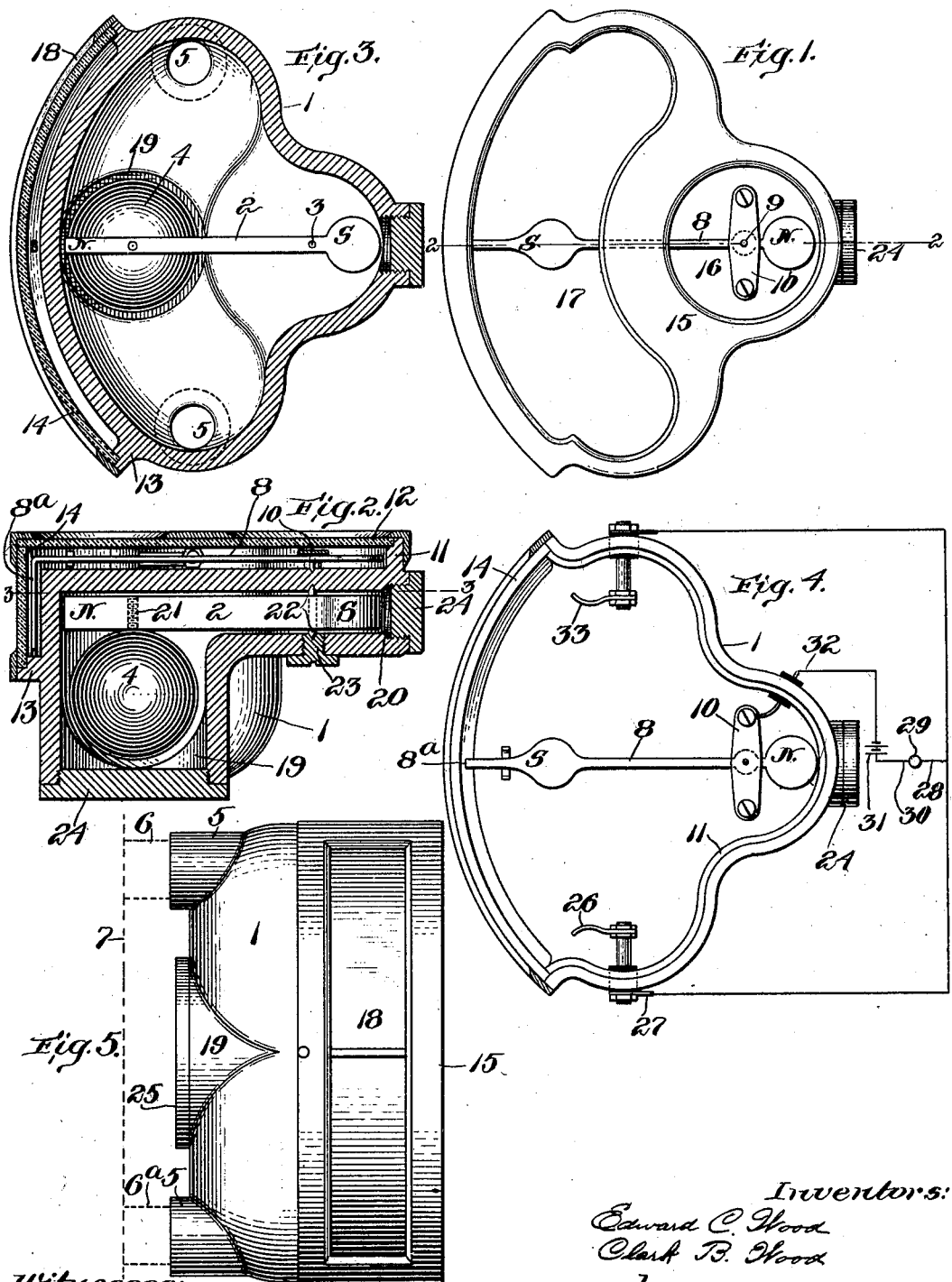
Witnesses:
Grace E. Gibbons.
George L. Kelley.
Inventors:
Edward C. Wood
Clark B. Wood
by
Roberts & Mitchell
Attorneys.

No. 770,141. Patented September 13, 1904.

UNITED STATES PATENT OFFICE.

EDWARD C. WOOD, OF SOMERVILLE, AND CLARK B. WOOD, OF BOSTON, MASSACHUSETTS, ASSIGNORS OF ONE-THIRD TO SAMUEL T. FROTHINGHAM, OF BOSTON, MASSACHUSETTS.

WATER-GAGE.

SPECIFICATION forming part of Letters Patent No. 770,141, dated September 13, 1904.

Application filed December 16, 1903. Serial No. 185,355. (No model.)

*To all whom it may concern:*

Be it known that we, EDWARD C. WOOD, a resident of Somerville, in the county of Middlesex, and CLARK B. WOOD, a resident of Boston, in the county of Suffolk, State of Massachusetts, citizens of the United States, have invented new and useful Improvements in Water-Gages, of which the following is a specification.

Our invention relates to water-gages—such, for example, as are used to show the level of the water in a steam-generator.

Heretofore the most common device used to show the level of the water in a steam-generator has been the well-known vertical glass tube communicating at its upper end with the generator at a point above the water-level and at its lower end with the generator at a point below the water-level. Such a device is objectionable in many ways, but chiefly because the glass tube frequently bursts under high pressure, causing personal injury or damage to property from flying glass, hot water, or steam. The interior of the glass tube in time becomes corroded, so that the water within it cannot be seen. Stuffing-boxes are required at the ends of the glass tube, which are liable to leak, and the tube is also liable to be broken either by the water therein freezing or by an accidental blow. Another device heretofore used to indicate the level of the water in a steam-generator consisted of a float on an arm fixed to a stem extending through the wall of the generator or through the wall of a chamber communicating with the generator, and this stem was connected with a pointer or the like, the position of which showed the height of the water within the generator. The objection to such a device, however, was that a stuffing-box was required to close the joint around the stem, and even then under high pressure it was impossible to prevent leakage. Moreover, any attempt to prevent leakage under high pressure by crowding the packing around the stem acted to interfere with the free movement of the stem and to make the gage inaccurate.

Our invention has for its object to provide an improved water-gage, and particularly to obviate the above-noted objectionable characteristics of such devices as heretofore constructed. Also our invention has in view to provide a water-gage of simple and strong construction that cannot be easily injured or tampered with, that will not require valves or stuffing-boxes, and one that will be safe and reliable at all times and under all conditions. The particular use for which it is intended will of course determine the form of our invention; but as herein shown we have embodied the same in a new article of manufacture which may be attached to the exterior of a steam-generator or other vessel whose contents it is desired to gage; but, as will be clear from what follows, it is wholly immaterial whether our invention is embodied in an attachment for a generator or other vessel or whether it is embodied in the structure of the generator or other vessel itself.

Our improved water-gage comprises, essentially, a vessel, a float, a magnet, and an armature for the magnet. In the best form of our invention and as herein shown the vessel is made of non-magnetic material, preferably brass composition, and within said vessel is arranged the float and magnet, the latter connected with the former so as to move with it. Upon the outside of the vessel and in the field of the magnet is arranged the armature, which is movably mounted on the exterior of the vessel, so as to follow the magnet when the latter moves with the float. The movements of the float occasioned by variations in the height of the water within the vessel are transmitted mechanically to the magnet and from the magnet magnetically to the armature upon the exterior of the vessel, so that the position of the armature indicates accurately the height of the water within the vessel. In this way we dispense with mechanical connections passing through the wall of the vessel, and therefore the use of leaky stuffing-boxes is obviated. Moreover, the vessel being made of metal cannot be injured by any ordinary or reasonable use and will withstand exceedingly high internal pressures. Of course it is wholly immaterial as to which, the magnet or its armature, is within the vessel and which is upon the outside thereof, for the mode of operation in either case would be the same, and while we have herein shown the magnet as within the vessel, yet it is obvious that the positions of the magnet and armature can be reversed without departing from our invention.

In the accompanying drawings, Figure 1 is a side view of a water-gage embodying one form of our invention. Fig. 2 is a section on line 2 2 of Fig. 1. Fig. 3 is a section on line 3 3 of Fig. 2. Fig. 4 is a side view of the gage shown in Fig. 1, but with some of its parts removed. Fig. 5 is a front view of the gage shown in Fig. 1.

Having reference to the drawings, 1 represents a vessel of non-magnetic material, preferably brass composition, within which is arranged a magnet 2, pivoted at 3 and carrying a float 4 at its opposite end. Vessel 1 is made with two ports 5 5, one near the top and the other near the bottom thereof, and these two ports are adapted to be connected by nipples, as indicated at 6 and 6ᵃ in Fig. 5, with a steam-generator, (indicated at 7.)

One of the ports 5 communicates with the generator through the pipe 6 at a point above the water-line, and the lower port 5 communicates through the pipe 6ᵃ with the generator below the water-line, so that the water-level in the vessel 1 is the same as in generator 7 and rises and falls correspondingly with variations in the water-level in generator 7.

Upon the outside of vessel 1 is arranged an armature 8, which is pivotally mounted at 9 between a bridge 10, fixed to vessel 1, and the adjacent wall of said vessel. The free end of armature 8 is bent at right angles with the body portion thereof, so as to provide a laterally-projecting extension 8ᵃ. The exterior of vessel 1 is made with a raised rim 11, which provides a seat for a flat glass panel 12, and with a raised rim 13, which provides a seat for a curved glass panel 14. A light frame 15, fixed by screws or otherwise to the exterior of vessel 1, holds the panels 12 and 14 in place. This frame 15 is cut away or left open at 16, 17, and 18, so that the armature 8 is visible from one direction through openings 16 and 17 and from another direction through opening 18. The superstructure made up of the panels 12 and 14 and frame 15 serves as a shield to protect armature 8.

In order that magnet 2 and float 4 may be properly assembled within vessel 1, said vessel is made with a passage 19, through which float 4 is passed into the vessel, and with a passage 20, through which magnet 2 is passed into the vessel. Float 4 is made with a threaded stud 21, which is screwed into a tapped hole in magnet 2. Magnet 2 is made with trunnions 22, one of said trunnions having a bearing on the wall of vessel 1 and the other trunnion having a bearing on a threaded plug 23, screwed into a tapped hole in the wall of vessel 1. After the magnet and float have been assembled within vessel 1 passage-ways 19 and 20 are permanently closed by caps 24 and 25.

As will be seen, there is no mechanical connection between magnet 2 and armature 8, and therefore no stuffing-boxes are required through which leakage can occur. Moreover, vessel 1 being made of metal will withstand any ordinary internal pressure, so that our improved water-gage is particularly applicable to use on high-pressure steam-generators.

When armature 8 is moved by magnet 2 to its lowermost point, it engages a contact 26, connected by wires 27 and 28 with a bell or other signal 29, and bell 29 is connected by a wire 30 with a battery 31, the latter being connected by a wire 32 with bridge 10, so that a circuit through bell 29 is closed and the latter is operated when armature 8 is against contact 26. This automatic operation of bell 28 calls the attention of the operator to the fact that the water in the generator should be replenished. When armature 8 is moved by magnet 2 into its uppermost position, it engages a contact 33, connected by a wire 31 with wire 28, so that a second circuit is closed through bell 35, which calls the attention of the operator to the fact that the supply of water to the generator should be reduced. It will thus be seen that variations in the height of water in generator 7 will raise and lower float 4 and magnet 2 and that the attraction of magnet 2 for its armature 7 causes the latter to follow said magnet in its movement, so that the position of armature 8 is a true indication of the height of the water in generator 7, also that when the water-level falls or rises to a predetermined extent an audible signal is sounded.

Preferably armature 7 is polarized, and its south pole is arranged opposite the north pole of magnet 2, so that the power available to move armature 8 is the sum of the strength of the magnet 2 and of armature 8.

Our invention as herein shown is intended particularly for use in connection with the generator of a motor-propelled vehicle, and when used in this connection it has many advantages over water-gages as heretofore constructed. It is capable of withstanding any ordinary and reasonable use, it is not liable to burst under high pressure, there is no leakage of steam, it is exceedingly simple, it is visible from many points of view, it is small and compact, it is not liable to injury from freezing, and if neglected by the operator it automatically attracts his attention by operating a signal when the water gets too high or too low.

What we claim is—

1. The combination with a vessel made with two ports, one near its top and the other near its bottom both adapted to be connected with a steam-generator or the like, of a magnet and an armature, one of the two last-mentioned parts being pivotally mounted within the vessel and the other of said parts being pivotally mounted upon the exterior of the vessel on an axis coincident with the axis of the part within the vessel, and a float mounted directly upon the part within the vessel.

2. The combination with a vessel made with two ports, one near its top and the other near its bottom both adapted to be connected with a steam-generator or the like, of a magnet and an armature, one of the two last-mentioned parts being pivotally mounted within the vessel, and the other of said parts being pivotally mounted upon the exterior of the vessel on an axis coincident with the axis of the part within the vessel, said part upon the exterior of the vessel being made with a body portion parallel with one side of the vessel and with a lateral extension parallel with another side of the vessel, and a float mounted directly upon the part within the vessel.

3. The combination with a vessel made with two ports, one near its top and the other near its bottom, both adapted to be connected with a steam-generator or the like, of a magnet and an armature, one of the two last-mentioned parts being pivotally mounted within the vessel and the other of said parts being pivotally mounted upon the exterior of the vessel on an axis coincident with the axis of the part within the vessel, said part upon the exterior of the vessel being made with a body portion parallel with one side of the vessel and with a lateral extension parallel with another side of the vessel, a superstructure fixed to the exterior of the vessel made with a transparent panel alongside and covering the body portion of the part upon the exterior of the vessel and with a transparent panel alongside and covering the lateral extension of said part, and a float mounted directly upon the part within the vessel.

Signed by us at Boston, Massachusetts, this 4th day of December, 1903.

EDWARD C. WOOD.
CLARK B. WOOD.

Witnesses:
ARTHUR F. RANDALL,
JOSEPH T. BRENNAN.